United States Patent [19]

Thompson

[11] 4,219,360
[45] Aug. 26, 1980

[54] PRODUCTION OF BONE CHINA

[75] Inventor: Raymond Thompson, Esher, England

[73] Assignee: United States Borax & Chemical Corporation, Los Angeles, Calif.

[21] Appl. No.: 65,259

[22] Filed: Aug. 9, 1979

Related U.S. Application Data

[63] Continuation-in-part of Ser. No. 958,286, Nov. 6, 1978, abandoned.

[30] Foreign Application Priority Data

Nov. 28, 1977 [GB] United Kingdom ............... 49473/77
Feb. 28, 1979 [GB] United Kingdom ............... 07105/79

[51] Int. Cl.$^2$ ............................................. C04B 33/24
[52] U.S. Cl. ........................................ 106/45; 106/73; 423/155; 423/158; 423/277; 423/278; 423/279; 423/301; 423/305; 423/306; 423/432
[58] Field of Search ................... 106/45, 46; 423/277, 423/278, 279, 432, 433, 155, 158, 301, 305, 306

[56] References Cited

U.S. PATENT DOCUMENTS

| | | | |
|---|---|---|---|
| 3,303,036 | 2/1967 | Coffin | 106/73 |
| 3,532,522 | 10/1970 | Richards | 106/45 |
| 3,704,146 | 11/1972 | Dulat | 106/45 |
| 3,893,841 | 7/1975 | Nijhawan et al. | 106/45 |
| 4,134,772 | 1/1979 | Ichiko et al. | 106/45 |

FOREIGN PATENT DOCUMENTS

| | | | |
|---|---|---|---|
| 2851027 | 5/1979 | Fed. Rep. of Germany | 106/45 |
| 46-28404 | 8/1971 | Japan | 106/45 |
| 426966 | 5/1974 | U.S.S.R. | 423/277 |

OTHER PUBLICATIONS

Chem. Abstracts–vol. 83, item 47104v "Manufacture of Art Wares: Bone Earthenware Toy" (1975).

Primary Examiner—Helen M. McCarthy
Attorney, Agent, or Firm—James R. Thornton

[57] ABSTRACT

Bone china is produced by including a boron-containing substance in the composition in water-insoluble form. Use of the boron-containing compound results in a lowering of the firing temperature and widening of the firing temperature range.

21 Claims, No Drawings

4,219,360

PRODUCTION OF BONE CHINA

This is a continuation in part of my co-pending application Ser. No. 958,286 filed Nov. 6, 1978 now abandoned.

SUMMARY OF THE INVENTION

This invention relates to the production of bone china from clay, bone ash and a boron-containing flux. The invention provides a method of making bone china, and provides also a novel boron-containing bone ash and method of making it, for use in the production of bone china. The effect of using a boron-containing material as flux in making bone china is to promote formation of the microcrystalline phase which is characteristic of bone china, and thus make it possible for bone china to be made with a wider firing temperature range, in shorter time and/or at lower temperatures than normal.

BACKGROUND OF THE INVENTION

Bone china is made by firing a mixture of clay, bone ash and a flux. Normally the clay is predominantly kaolin or china clay. The most commonly used flux is Cornish Stone but other naturally-occurring felspathic materials such as nepheline syenite may be used.

Bone ash such as used in the production of bone china is made by first treating animal bone with hot or boiling water under pressure so as to remove gelatine, collagen and other organic matter. In this state, the bone is said to be degelatinized. It is afterwards calcined to a temperature of about 1000° C. in order to burn off the remaining organic matter. Calcined bone or bone ash is substantially (about 80 percent) calcium phosphate, with some calcium carbonate and a little fluoride.

Ceramic compositions for making bone china comprise typically 50% bone ash, 25% china clay and 25% Cornish stone. They are made into a ceramic body by intimately mixing and usually wet milling the particulate ingredients so as to produce an aqueous slurry or slip suitable for casting in plaster molds; or at lower water content a plastic clay which may be molded or shaped. After drying to evaporate the water, such shaped objects in the "green" state are then fired to a temperature in the region of 1250° C. in order to produce unglazed "china biscuit" ware of low porosity and characteristic translucency. The biscuit ware is subsequently coated with a glaze slip and refired to a temperature of about 1100° C. to produce glazed china. One of the principal characteristics of ware produced in this way is the translucency, coupled with whiteness, for which bone china (sometimes called fine china or English bone china) is renowned. Because of its strength, it is also possible to produce objects of thinner wall section than is the case with other forms of pottery, which enhances lightness of weight, translucency and resistance to thermal shock.

The final microstructure of bone china results from reactions during firing, the crystalline materials originally produced having been dissolved and new crystals formed. Bone china after firing consists of about 70% crystals and 30% of a glassy phase. The crystals are mainly $\beta$-tricalcium phosphate and anorthite (a lime felspar). The high crystal content of bone china accounts for its good mechanical strength.

Bone china of substantially the above type and composition has been produced for some two hundred years and changes in formulation and fabrication have been evolutionary. The composition requires a higher firing temperature than is needed for earthenware and consequently the firing cycle is comparatively prolonged and the costs of both the kilns and the fuel used are higher. The firing time is also lengthened relative to earthenware in order to allow formation of the calcium phosphate-based phases which impart the characteristic strength and translucency.

Methods for making the ceramic clayware called "white ware", from clay, flint and a flux, in which certain boron-containing compositions are used as the flux are known. According to U.S. Pat. No. 3,532,522, a borate other than an alkali metal borate is used as the flux, e.g., calcium borate. According to U.S. Pat. No. 3,704,146, a ground vitreous frit which includes $B_2O_3$ in its oxide analysis is used as the flux.

DESCRIPTION OF THE INVENTION

The present invention provides a method for enhancing the formation of the calcium phosphate microcrystalline phases by the inclusion of a boron-containing substance. The boron-containing substance can serve as the flux or as part of the flux. Such inclusion aids vitrification and enables the china ware to be produced at a lower temperature or in a shorter time, or both. As an added benefit, the temperature range for firing is widened. This practice reduces fuel consumption, enables simpler kilns to be used, speeds firing rate and helps to avoid distortion of ware by virtue of the wider temperature ranges, as well as lower temperatures, required.

Thus, in one aspect of this inveniton, the boron-containing flux is combined with the bone-ash; it may be either one of the inherently water-insoluble borates, frits or glasses, or a water-soluble boric oxide containing material (but if water-soluble it must be bound to the bone-ash so as to be made insoluble). The boron-containing material may be bound to the bone ash by being fused or sintered or calcined with calcined bone, or by being calcined with degelatinized bone so that the calcination simultaneously converts the bone to bone ash and binds the boron-containing material to it.

The boron-containing substance may be boron phosphate, an inorganic borate other than an alkali-metal borate (e.g., a calcium borate), or may be ground vitreous frit whose oxide analysis includes $SiO_2$, $B_2O_3$, $CaO$ and/or $MgO$, and $Na_2O$ as described in U.S. Pat. No. 3,704,146 or British Pat. No. 1,254,717. Such materials may be used in the process of this invention either by milling them into the slip (or plastic clay) together with bone ash, kaolin and optionally Cornish stone, or by combining them with bone or bone ash as is necessary for water-soluble boron-containing materials.

The boron-containing material may alternatively be a borated bone formed by reaction of bone with boric acid or one of its water-soluble salts, or water-insoluble $B_2O_3$ containing materials. For example, boric acid or its salts can be combined with the bone ash by being fused or sintered with the ash, and the resultant material incorporated as pulverulent material in the slip. An alternative method of combination is to absorb an aqueous solution of the $B_2O_3$-containing material (or an aqueous suspension of a water-insoluble boron-containing material) onto bone, preferably after the bone has been degelatinized and before it is calcined to make bone ash, and then calcine the bone and adsorbate or absorbate. Preferred water-soluble boric oxide-providing materials are boric acid, sodium borate of $Na_2O:B$ $_2O_3$ ratio 1:4, and borax (sodium tetraborate decahydrate).

Calcination of bone containing boric acid or similar material is not always sufficient to make the $B_2O_3$ completely water-insoluble, and it has been found that the insolubilization can be improved by using also the precursor of at least one additional glass-forming oxide, e.g., sodium silicate, potassium carbonate, aluminum sulphate and calcium hydroxide. Alternatively, or additionally, boron phosphate can be used as an insoluble boron-containing flux. This may be added in the form of prepared boron phosphate or formed in situ by adding an equimolar mixture of boric and phosphoric acids to the bone before calcination.

The bone fragments can be steeped in aqueous liquor containing the source of $B_2O_3$ and optionally of the additional oxide, dried and then calcined at a temperature sufficient to react with or simply to form a glassy layer on the surface of the bone. It is not essential for the glassy layer to interact fully at this stage with the calcium phosphate substrate but desirable for the borate glass formed to be sufficiently insoluble in water after grinding for casting slips or moldable clays to be made satisfactorily on the addition of clay and other ingredients. Alternatively, precalcined bone may also be steeped in borate-containing liquors, dried and re-calcined to insolubilise the absorbed or adsorbed salts prior to milling. It is well-known that bone ash calcium phosphate has a high surface area and therefore a high liquid absorption capacity, but is has been found that the porosity and internal surface area of degelatinized but uncalcined bone are adequate to accept sufficient boric acid or borate salt solution for the practice of this invention. The advantage of using degelatinized bone is that only one calcination and milling operation is necessary to prepare a satisfactory ceramic body ingredient, thus effecting cost and fuel savings.

When boric acid (or $B_2O_3$ or metaboric acid) alone is used as the $B_2O_3$ source and no other glass-forming oxide precursor is introduced, the bone reacts on calcination to form $CaO-P_2O_5-B_2O_3$ phases. Compositions at all possible ratios within this ternary phase system do not appear to have been studied, but there is described in the literature a calcium borophosphate of composition $2CaO.P_2O_5.B_2O_3$ which is decomposed by water.

Calcium borophosphate compositions have been found to disproportionate on heating to high temperature. For example, the composition $2CaO.P_2O_5.B_2O_3$ melts incongruently at around 1050° C. to form $\beta$-$2CaO.P_2O_5$ and liquid $B_2O_3$. Related compositions within this ternary system behave similarly and it is believed that the effect of a calcium phosphate phase crystallization and synerisis of a $B_2O_3$-containing liquid phase also occurs in compositions to which $Na_2O$ has been introduced initially. During the firing of conventional bone china, the bone phosphate, kaolin and Cornish stone interact to form glassy phases from which $\beta$-calcium phosphate and anorthite crystallize subsequently. Total melting does not occur and the more refractory phases remain and help to retain the shape and relative rigidity of the object being fired. According to the present invention, the interaction of particulate ingredients is accelerated by the presence of $B_2O_3$-containing substance in the calcined bone. This enables a corresponding and satisfactory degree of vitrification to be achieved, without distortion of shape, at lower temperatures and in shorter firing schedules. The mechanism is not fully understood, but the liberation of $B_2O_3$-rich phases and their reaction and bonding with the siliceous ingredients is likely. The microcrystalline phases remaining after cooling are probably similar to those contained in conventional bone china but their crystallite size and shape, and the proportions of respective crystalline phases, may be different.

On calcination to a suitable temperature, insolubilization of the initially highly soluble $B_2O_3$ substance such as sodium borate takes place by chemical reaction with the calcium and phosphate contents of the bone.

Thus, one aspect of the invention is a bone-ash for the manufacture of bone china comprising calcined bone on which has been incorporated by calcination a source of $B_2O_3$. Another aspect of the invention is a method of preparing bone ash, which comprises degelatinizing animal bone, optionally (but preferably not) calcining the degelatinized bone, then mixing the degelatinized or calcined bone with a substance which contains $B_2O_3$ and then calcining the mixture whereby $B_2O_3$ or a precursor thereof is absorbed or adsorbed onto the bone. In this process, the source of $B_2O_3$ may be a water-soluble chemical compound of $B_2O_3$ in which case fragments of the bone are steeped in an aqueous solution or suspension of said chemical compound. In the preferred form of the method of this invention, however, the source of $B_2O_3$ is a ground vitreous frit having $B_2O_3$ in its oxide analysis, and then a mere mixture of the degelatinized bone and the powdered frit can be calcined with satisfactory results.

If desired, the degelatinized bone can be mixed with a slurry of the ground frit in water to form a paste, which is then calcined.

The preferred flux is a ground vitreous frit which includes $B_2O_3$ in its oxide analysis, namely a ground vitreous frit whose oxide analysis includes $SiO_2$, $B_2O_3$, CaO and/or MgO, and $Na_2O$. In the present invention, the frit optionally also includes $Al_2O_3$. When bone china is made by slip-casting, the slip has to be deflocculated, and we have found that a borated bone ash made by calcining together degelatinized bone and such a ground vitreous frit, when combined with clay to form a slip, gives a slip which can be deflocculated effectively.

For the co-calcination of bone with frit, a temperature in the range of from about 900° to 1200° C. is suitable, and 950° to 1100° C. is preferred. The quantity of the frit is generally small in relation to the quantity of bone, e.g., about 10% by weight frit, 90% by weight bone. The bone is suitably borated with the frit to contain about 1 to about 12% $B_2O_3$, preferably about 2 to 8% with 2.5 to 5% $B_2O_3$ being most preferred. This content may be achieved by mixing a more highly borated bone with ordinary bone.

In a preferred method according to this invention, an aqueous slurry of a finely-ground (about 80% less than 25 microns) $B_2O_3$-containing frit is mixed with degelatinized bone, such that the particles of frit stick to the larger (up to about $\frac{3}{8}$ inch) particles of bone, on the surface, in the pores, etc. This mixture is then calcined at a temperature of about 1000° C., cooled, dry-crushed and then wet-milled. The resultant slurry is filtered and the cake dried and crumbled or lightly milled. This product can then be mixed with the appropriate amount of kaolin (and optionally a small amount of Cornish stone) and water to give the casting slip from which the ware is made.

Although slip-casting is preferred, other known methods for manufacturing flatware may be employed with the compositions of this invention.

The amount of $B_2O_3$-containing compound incorporated in the bone-clay mixture should be sufficient to provide from about 0.5 to about 6% by weight of $B_2O_3$ in the composition, preferably about 1 to 4% $B_2O_3$.

The following examples illustrate the invention:

EXAMPLE I

Preparation of Borated Bone

Four bone samples, reference A, B, C and D in Table I, were prepared from bone which had been degelatinized and calcined and five samples, reference E, F, G, H and J, were prepared from bone which had been degelatinized but not calcined. Samples A and E were treated with aqueous boric acid solution to introduce the quantity of $B_2O_3$ shown in Table I; Samples B and F were treated with an aqueous solution of sodium borate (1:4 $Na_2O:B_2O_3$) to introduce the quantities of $Na_2O$ and $B_2O_3$ shown in Table I; Samples C and G were treated with an aqueous solution of borax to introduce the quantities of $Na_2O$ and $B_2O_3$ shown in Table I; Samples D and H were treated with an aqueous solution of borax and sodium silicate to introduce the quantities of $B_2O_3$, $Na_2O$ and $SiO_2$ shown in Table I; and Sample J was heated with an aqueous solution of boric and phosphoric acids to introduce the quantities shown in Table I.

TABLE I

|  | A | B | C | D | E | F | G | H | J |
|---|---|---|---|---|---|---|---|---|---|
|  |  |  |  |  | (parts) |  |  |  |  |
| calcined bone | 90 | 88 | 86.4 | 78.9 |  |  |  |  |  |
| degelatinized bone |  |  |  |  | 95 | 88 | 87.6 | 80.1 | 100 |
| $B_2O_3$ | 10 | 9.8 | 9.4 | 8.6 | 5 | 9.8 | 8.6 | 8.6 |  |
| $H_3BO_3$ |  |  |  |  |  |  |  |  | 5.8 |
| $Na_2O$ |  | 2.2 | 4.2 | 9.6 |  | 2.2 | 3.8 | 8.8 |  |
| $H_3PO_4$ |  |  |  |  |  |  |  |  | 9.2 |
| $SiO_2$ |  |  |  | 2.9 |  |  |  | 2.5 |  |

For each sample, the bone was immersed in the aqueous solution, dried and then calcined at 1000° C. After calcination, Samples A to D, which had been made from a calcined powder, were lightly sintered and these were re-ground to pass 350 B.S. mesh. After calcination, Samples E to J, which were in the form of small lumps of treated bone, were broken down and ground to pass 350 B.S. mesh.

EXAMPLE II

Ceramic Compositions

Each of samples A to J from Example I was used as a component in a ceramic mix, and two samples of calcined but unborated bone were similarly used, as a control, in a ceramic mix. Compositions of the eleven mixes were as in Table II.

TABLE II

|  | Bone (parts) |  | Cornish Stone (parts) | China Clay (parts) |
|---|---|---|---|---|
| Control 1 | calcined bone | (50) | 25 | 25 |
| Control 2 | calcined bone | (50) | 25 | 25 |
| A | borated bone A | (55.6) | 19.4 | 25 |
| B | borated bone B | (56.8) | 18.2 | 25 |
| C | borated bone C | (57.9) | 17.1 | 25 |
| D | borated bone D | (62.6) | 12.4 | 25 |
| E | borated bone E | (52.6) | 22.4 | 25 |
| F | borated bone F | (56.8) | 18.2 | 25 |
| G | borated bone G | (57.1) | 17.9 | 25 |
| H | borated bone H | (62.4) | 12.6 | 25 |
| J | borated bone J | (55.0) | 20 | 25 |

The dry powders were thoroughly mixed and compressed into rods ½ inch diameter × 1 inch in length. They were placed in a kiln and the temperature raised to 1050° C. at a rate of 100° C./hour, maintained at 1050° C., for 6 hours and slowly cooled to ambient temperature. In addition, specimens of the "standard bone china" mix (control 2) were heated to 1250° C., the normal firing temperature for bone china.

Compression strength measurements were carried out on the specimens to indicate the degree of vitrification. The results were as in Table III.

TABLE III

|  | Firing Temperature (°C.) | Compression Strength (psi) | Times Stronger than Control 2 |
|---|---|---|---|
| Control 1 | 1050 | 480 | — |
| Control 2 | 1250 | 10700 | — |
| A | 1050 | 13400 | 1.3 |
| B | 1050 | 12900 | 1.2 |
| C | 1050 | 15800 | 1.5 |
| D | 1050 | 12000 | 1.1 |
| E | 1050 | 11000 | 1.0 |
| F | 1050 | 12400 | 1.2 |
| G | 1050 | 14800 | 1.4 |
| H | 1050 | 9100 | 0.9 |
| J | 1050 | 11000 | 1.0 |

EXAMPLE III

Ceramic Composition

As an alternative to the use of bone in which a $B_2O_3$-containing substance has previously been incorporated, it is possible to introduce, $B_2O_3$ to the ceramic mix as a separate composition in admixture with the bone and other body ingredients. In this example, a body made by milling together 50 parts of calcined bone, 10 parts of the borate flux "24 S50" described in U.S. Pat. No. 3,704,146, 20 parts of china clay and 20 parts of Cornish stone was fired for 6 hours at 1050° C. The fired body had a compression strength of 12600 p.s.i. which was 26 times stronger than the control body (50 parts bone, 25 parts china clay, 25 parts Cornish stone) prepared and fired under identical conditions and was 1.2 times stronger than the control body fired at 1250° C.

Example IV

This example shows that use of a separate flux is not essential when the borated bone of this invention is used. 100 Parts of calcined bone were mixed with 20 parts anhydrous borax and 10 parts silica. This mixture was calcined at 1000° C. and ground to pass 350 mesh B.S.

A body mix was prepared from 65 parts of this borated bone and 35 parts china clay, pressed and fired at 1050° C. as in Example II. Fired bodies were of strength equal to that of a control body fired at 1250° C.

EXAMPLE V

This example shows that bone china bodies having adequate strength and translucency may be prepared using the flux of this invention as the sole fluxing agent and firing to temperatures substantially lower than 1250° C.

Bodies were prepared by blunging the compositions in Table IV in water, removing excess water on a Plaster of Paris bat and extruding through a deaerating pugmill. Rods ½" diameter x 6" were prepared for measurement of modulus of rupture and discs 1¼" diameter a ⅛" thick for measurement of translucency. Modulus of rupture was measured by measuring the load applied at the mid-point required to break a specimen supported at 4 inch centers. Translucency was determined by measuring the light transmitted by the specimen and is expressed as a percentage of the amount of light of the same intensity transmitted by standard bone china fired at 1250° C. Results are given in Table V.

TABLE IV

| Composition No. | Calcined Bone | China Clay | Bentonite | Borate* 24 S50 | Borate* A S50 | Boron Phosphate |
| --- | --- | --- | --- | --- | --- | --- |
| 1 | 63 | 31 | 1 | 5 | | |
| 2 | 63 | 32 | 1 | 4 | | |
| 3 | 63 | 31 | 1 | | 5 | |
| 4 | 64 | 32 | 1 | | 3 | |
| 5 | 64 | 32 | 1 | | | 3 |
| 6 | 65 | 32 | 1 | | | 2 |

*as described in U.S. Pat. No. 3,704,146.

TABLE V

| Composition No. | Firing Temperature (°C.) | Modulus of Rupture (lb/sq. in.) | Translucency (%) |
| --- | --- | --- | --- |
| 1 | 1180 | 13,900 | 103 |
| 2 | 1215 | 15,500 | 118 |
| 3 | 1180 | 11,300 | 109 |
| 4 | 1215 | 15,200 | 113 |
| 5 | 1180 | 18,900 | 47 |
| 6 | 1250 | 17,000 | 102 |
| Control | 1250 | 12,000–15,000 | — |

EXAMPLE VI

A vitreous frit having the oxide analysis 10% $Na_2O$, 10% CaO, 25% $B_2O_3$, 5% $Al_2O_3$ and 50% $SiO_2$ was prepared by the method described in British specification No. 1,254,717 and ground to particles small enough to pass a 350 B.S. mesh.

725 g. of degelatinized bone (about 500 g. solid and 225 g. absorbed water) in the form of small lumps of average size about 1 cm. were mixed with 64.5 g. of the finely ground frit slurried in 60 ml. of water. The mixture was calcined at 1000° C. for 3 hours. The product was dry ground and wet milled to give a finely powdered, ready-fluxed bone containing 3.59% $B_2O_3$.

The fluxed bone was used to prepare a bone china body slip to the following formulation.

| | |
| --- | --- |
| Fluxed bone | 69 g. |
| China clay | 31 g. |
| Water | 50 ml. |

The mixture, after deflocculating with a polyacrylate deflocculant, gave a low viscosity, free-flowing slip suitable for slip casting.

EXAMPLE VII (i) A frit as described in British Patent Specification No. 1,254,717, comprising 10.3% $Na_2O$, 11.7% CaO, 44.7% $B_2O_3$ and 33.3% $SiO_2$ was prepared and finely ground. 725 g. of degelatinized bone (containing absorbed water as before) were mixed with 37.5 g. of frit slurried in 50 ml. of water. The mixture was calcined and milled as described in Example VI to give ready-fluxed bone containing 3.95% $B_2O_3$.

(ii) A ready-fluxed bone was prepared as described in (i) using a frit comprising 10.3% $Na_2O$, 11.7% MgO, 44.7% $B_2O_3$ and 33.3% $SiO_2$.

The bone boronated both with the CaO-containing and with the MgO-containing frit was formed into a slip with china clay and water, and again gave a good slip for slip-casting.

EXAMPLE VIII

The compositions containing borated bone, clay and water according to Examples VI and VII can be dewatered to a pasty consistency. The resultant plastic clay, of lower water content than a slip, can be molded and shaped by known techniques to make plates, saucers and other flatware.

Various changes and modifications of the invention can be made, and, to the extent that such variations incorporate the spirit of the invention, they are intended to be included within the scope of the appended claims.

What is claimed is:

1. In the method of making bone china by firing a composition comprising bone ash and clay, the improvement which consists of adding to the composition prior to firing a boron-containing substance which is in water-insoluble form.

2. A method according to claim 1 in which the boron-containing substance is $B_2O_3$-containing frit.

3. A method according to claim 1 in which the boron-containing substance is combined with the bone.

4. A method according to claim 3 in which Cornish stone is also present in the composition.

5. A method according to claim 3 in which the boron-containing substance has been combined with the bone by treating the bone with a source of boric oxide and then calcining it.

6. A method of preparing fluxed bone ash for the manufacture of bone china, which comprises degelatinizing animal bone, mixing the degelatinized bone with a substance which when calcined makes available $B_2O_3$ for combination with the bone or which contains $B_2O_3$ and when calcined combines with the bone, and calcining said mixture to convert it to boron-containing bone ash.

7. A method of preparing bone ash, which comprises degelatinizing animal bone, steeping the fragments of the bone in an aqueous solution or suspension of $B_2O_3$ or a substance which on heating is converted to $B_2O_3$, whereby $B_2O_3$ or its precursor is absorbed or adsorbed onto the bone, and calcining the bone to convert it to bone ash.

8. A method of preparing bone ash, which comprises degelatinizing and calcining animal bone, steeping the bone ash in an aqueous solution of $B_2O_3$ or a substance which on heating is converted to $B_2O_3$ whereby $B_2O_3$ or its precursor is absorbed or adsorbed onto the bone ash, and calcining the bone ash.

9. A method according to claim 5 in which aqueous boric acid or aqueous sodium borate is used as the source of boric oxide.

10. A method according to claim 7 in which aqueous boric acid or aqueous sodium borate is used as the source of boric oxide.

11. A method according to claim 7, in which said substance is a ground vitreous frit whose oxide analysis includes $B_2O_3$.

12. A method according to claim 11 in which said frit has an oxide analysis including $B_2O_3$, $SiO_2$, $Na_2O$ and at least one of CaO and MgO.

13. A method according to claim 12 in which the oxide analysis of said frit includes also $Al_2O_3$.

14. A bone ash for the manufacture of bone china comprising calcined bone on which has been incorporated by calcination a source of $B_2O_3$.

15. A bone ash according to claim 14 in which the source of $B_2O_3$ is a ground vitreous frit whose oxide analysis includes $B_2O_3$.

16. A bone ash according to claim 15 in which the frit has an oxide analysis including $B_2O_3$, $SiO_2$, $Na_2O$ and at least one of CaO and MgO.

17. A bone ash according to claim 16 in which the frit includes also $Al_2O_3$.

18. A bone ash according to claim 14 containing 2.5% to 5% by weight $B_2O_3$.

19. A method of making bone china, which comprises forming a slip containing clay and bone ash containing about 2.5 to 5% by weight $B_2O_3$, deflocculating the slip, and shaping the slip to body and firing the body.

20. Bone china produced according to the method of claim 1.

21. A method according to claim 1 in which the boron-containing substance is a borate flux.

* * * * *